BEST AVAILABLE COPY

B. S. ROBERTS.

Breech Loading Fire Arm.

No. 3,722. Reissued Nov. 9, 1869.

Witnesses
W. J. Campbell
Edwd Hope

Inventor
B. S. Roberts
by
Munn, Dennick & Hammond

N. PETERS, Photo-Lithographer, Washington, D. C.

United States Patent Office.

B. S. ROBERTS, OF UNITED STATES ARMY.

*Letters Patent No.* 65,607, *dated June* 11, 1867; *reissue No.* 3,562, *dated July* 20, 1869; *reissue No.* 3,722, *dated November* 9, 1869.

IMPROVEMENT IN BREECH-LOADING FIRE-ARMS.

The Schedule referred to in these Letters Patent and making part of the same.

*To all whom it may concern:*

Be it known that I, B. S. ROBERTS, of the United States Army, have invented a new and improved Breech-Loading Fire-Arm; and I do hereby declare that the following is a full, clear, and exact description thereof, reference being had to the accompanying drawings, making a part of this specification, in which—

Similar letters of reference indicate corresponding parts in the several figures.

One object of this invention is to employ a breech-plug, which swings about a solid curved abutment formed on the frame to which the barrel is secured, and to apply, to the front end of this breech-plug, a rocking recoil-shield, having a flat forward face, which will fit squarely against the breech-end of the barrel, when in line therewith, and which will allow of the swinging of the breech-plug in the act of opening and closing the rear end of the barrel, as will be hereinafter described.

Another object of my invention is to employ a sliding firing-pin in conjunction with a swinging breech-plug, having a rocking recoil-shield applied to its front end, said firing-pin being so arranged as to transmit the blow of the hammer upon it to the flange of the cartridge, and ignite the powder therein, as will be hereinafter described.

Another object of my invention is to effect the extraction of flanged cartridge-shells from the barrel at the moment the breech-plug is moved to a position for allowing of the escape of the shell, by having a portion of the rocking recoil-shield on the breech-plug strike one arm of a pivoted extractor, which is arranged on one side of the barrel, and lies in front of the flange of the shell, at such moment, as will be hereinafter described.

Another object of my invention is to form, on the rear extension of a swinging breech-plug, an extension, constituting, with said plug, a lever, by which the same may be conveniently swung on or about its axis.

Another object of my invention is to apply, to a rear extension of the swinging breech-block or plug, a spring-catch, having a rear lever-extension formed on it, said catch being so arranged that it will engage with the tang of the frame of the arm, when the breech-plug is moved in a position for firing, and positively hold the plug against casual displacement, as will be hereinafter explained.

Another object of my invention is to so arrange a breech-plug, which swings bodily upon a solid curved abutment formed on the rear of the arm, that when this plug is in position for firing the gun, it shall be centrally located with respect to the axis of the barrel, and have no tendency to be moved out of such position by reason of the force of the gas, when the gun is fired, as will be hereinafter explained.

In the accompanying drawings—

A represents a solid breech-frame, consisting of the reinforce *a*, into which the rear end of the barrel A′ is screwed, for giving strength to the barrel at this point, two parallel cheeks, *b b*, between which the breech-plug is supported laterally, and a solid abutment, *c*, which has its front face rounded concentric to the axis of motion of the breech-plug, and which terminates in a tang, *d*, to which the lever-catch is connected.

Figure 1:
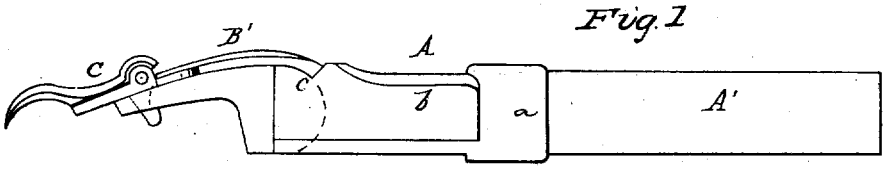
Figure 1 is a side view of my invention applied to the breech-frame and a portion of the barrel of a fire-arm.
Figure 2:
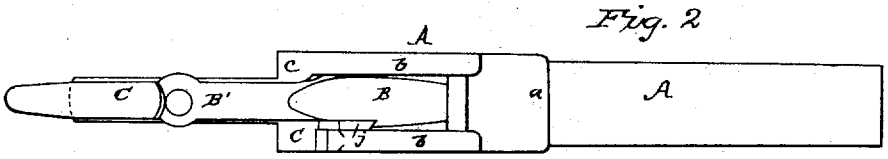
Figure 2 is a top view of the improved arm.

Within the space formed between the two cheeks *b b*, of frame A, is a breech-plug, B, the rear end of which is concave, so as to fit snugly and move upon the corresponding convex surface *c*; and from the upper portion of this rear end a lever, B′, which may be curved, as shown, extends backward, forming, with the plug, a convenient means of swinging the plug on its axis. The plug when down in place, as shown in fig. 3, fits snugly upon the upper solid faces of abutment *c* and tang *d*, as shown in figs. 1 and 3.

Figure 4:
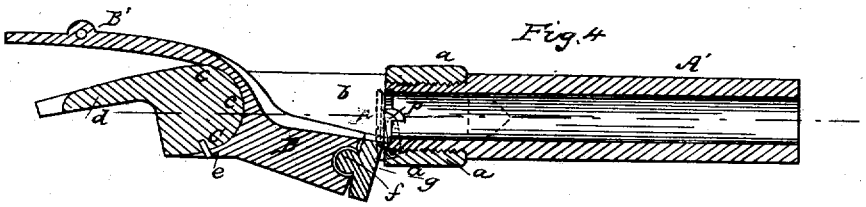
Figure 4 is a similar view of the same parts, with the breech-plug thrown down, to expose the breech of the barrel.
Figure 5:
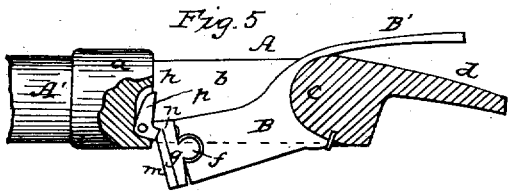
Figure 5 is a sectional view, showing the devices for extracting the cartridge-shells from the barrel.

The lower rear corner of the breech-plug B terminates in a lip, *e*, which, when the breech-plug is fully depressed, as shown in figs. 4 and 5, will strike against a stop, *e′*, on the abutment *c*, and thus prevent further descent of said breech-plug. The breech-plug is thus caused to move bodily about a concentric abutment, thus affording great strength, and admitting of the use of a very short breech-plug.

Figure 3:
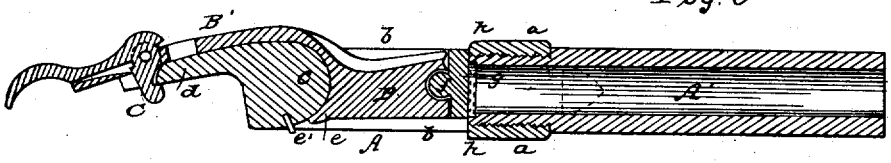
Figure 3 is a longitudinal section, taken vertically through the centre of the arm, showing the breech-plug in position for firing.

The forward end of the breech-plug B has a semicircular groove formed transversely in it, for receiving a corresponding tenon, *f*, which is formed on a recoil-shield, *g*, as shown in figs. 3, 4, and 5.

The front face of the shield *g* is flat, so that when it is adjusted in the position shown in fig. 3, this flat face will fit squarely against the vertical face *h*, and also against the but-end of the cartridge-shell.

A sufficient space is left between the rear surface of the shield *g* and front surface of the breech-plug B, to allow this shield a rocking movement, independent of its plug, so that when the front end of the latter, B, is depressed, to expose the breech of the barrel A′, the shield *g* will move perpendicularly downward for a short distance, and then swing in the arc of the circle with the breech-plug B. In ascending to its former position, shield *g* makes the same movement, as described.

The distance from the axis of motion of the breech-plug B to the centre of the front end of the rocking shield *g*, should be equal to the distance from said axis to a point touching the centre of the but of the cartridge-shell, when the latter is in place, as shown in fig. 3.

This renders it necessary to leave such a space between the plug B and the shield *g*, as will allow the upper end of the latter to recede as it descends.

The position of the breech-plug B, when held down by the latch C, as shown in fig. 3, is such that the recoil of the discharge is received directly and centrally upon the solid abutment *c*.

The upper surfaces of the breech-plug and rocking shield are grooved longitudinally, so as to allow space in the rear of the barrel, when the plug B is depressed, for the backward escape of the cartridge-shell, and also for the insertion of a ball-cartridge.

On one side of the breech-plug B, an inclined groove is formed, in which is inserted a firing-pin, *j*, upon the upper end of which the hammer strikes.

Figure 6:
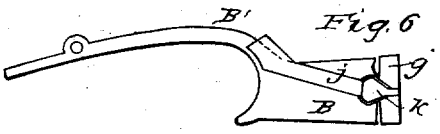
Figure 6 is a view of one side of the breech-plug and recoil-shield, showing the application of the firing-pin to them.

The lower end of this pin *j* abuts against a wedge-shaped pin, *k*, which is fitted into a recess formed in the rocking shield *g*, as shown in fig. 6.

Pin *k* is allowed to have a slight endwise movement in its recess, so that when struck by pin *j*, its front end will strike the flange of the cartridge, and ignite the powder therein.

The pin *k* is allowed to rock with the shield *g*, in opening and closing the breech of the barrel.

On the opposite side of the shield *g*, a groove, *m*, is made, leaving a lip, *n*, and in this groove the lower end of an extracting-lever plate, *p*, lies.

This plate *p* is pivoted in a recess formed in one side of a barrel, so that its upper end shall lie closely in the annular groove which is made in the barrel to receive the flange on the cartridges.

The upper end of the lever-plate *p* is thus arranged in such a position that when a cartridge is inserted in the rear end of the barrel, the extracting portion of said plate will fall in front of the flange on this cartridge. When lever B′ is suddenly raised, the lip *n* will strike the lower projecting end of the plate *p*, and thus thrust backward the upper end of this plate, and with it the cartridge-shell.

It will be seen, by reference to fig. 5, that the slot *m*, in the side of the recoil-shield, will allow this shield to be depressed until its upper grooved edge is below the plane of the cartridge-shell to be extracted, at which moment the lip or shoulder *n* will strike the rear arm of the extractor *p*, and eject the shell, or so loosen it in its chamber as to allow it to drop out.

It will also be seen that the breech-plug B is constructed so that it can be moved bodily in the arc of a circle, concentric to its solid abutment *c*. Thus, by a short movement on a short plug, the breech-end of the barrel can be exposed, to receive a cartridge, or closed, to fire the gun.

The curves at the end of the breech-plug B, and at the front side of the abutment *c*, are such that when said plug is depressed to a proper position, it can be taken out of its chambers; and the axis or centre of said curves is so arranged, with reference to the plane of the axis of the barrel A′, that the forces of the gas, when the gun is fired, have no tendency to throw said plug out of place.

The lever-latch C, which is pivoted near the rear end of the extension B′ of the breech-plug B, consists of a hooked catching portion, adapted to catch under the rear bevelled end of the tang *d*, a curved lever portion, which serves as a handle or finger-piece, and a spring, which is arranged so as to press the catching forward, so that when the extension B′ is pressed down, to bring the breech-plug home for firing the gun, the catch will engage with the tang *d*, and hold said plug in place.

Having described my invention,

What I claim as new, and desire to secure by Letters Patent, is—

1. In combination with a breech-plug, B, which swings about a curved abutment, *c*, a rocking shield, *g*, so applied to said breech-plug as to allow the opening and closing of the breech of the barrel for the insertion and withdrawal of a cartridge, substantially as described.

2. The breech-plug B, when adapted to fit and swing about the solid curved convex abutment *c c c*, and when it has formed, on its rear end, the extension B′, that constitutes a lever, by which the same may be conveniently manipulated, as described.

3. The lever B′, formed on the rear end of the swinging breech-plug B, and adapted to move about its solid abutment *c*, in combination with a rocking block, *g*, which will admit the opening and closing of the breech, substantially as described.

4. The lever-extractor *p*, arranged on one side of the barrel, and having one of its arms arranged in a recess in the recoil-shield, so as to be acted upon by the shoulder *n*, at the upper termination of said recess, substantially as described.

5. The curve *c c c*, at the rear of the cheeks containing the breech-plug B, when formed substantially as set forth, and so that the force of the gas, when the gun is fired, shall have no tendency to throw the breech-plug out of its place, as described.

6. A bodily swinging breech-plug, B, having a rear extension, B′, and a lever-latch, C, constructed substantially as described.

B. S. ROBERTS,
*Brig. Genl. U. S. A.*

Witnesses:
V. D. STOCKBRIDGE,
MALCOLM SEATON.